United States Patent
Ogino

(10) Patent No.: US 7,812,982 B2
(45) Date of Patent: Oct. 12, 2010

(54) NETWORK PRINTING SYSTEM FOR PROXY PRINTING

(75) Inventor: Junichi Ogino, Ibaraki-ken (JP)

(73) Assignee: Riso Kagaku Corporation, Tokyo (JP)

(*) Notice: Subject to any disclaimer, the term of this patent is extended or adjusted under 35 U.S.C. 154(b) by 1133 days.

(21) Appl. No.: 10/843,592

(22) Filed: May 12, 2004

(65) Prior Publication Data

US 2004/0227975 A1 Nov. 18, 2004

(30) Foreign Application Priority Data

May 13, 2003 (JP) ............... 2003-134174

(51) Int. Cl.
G06F 3/12 (2006.01)
G06K 15/00 (2006.01)
(52) U.S. Cl. ............ 358/1.15; 358/1.12; 358/1.13
(58) Field of Classification Search .......... 358/1.15, 358/1.18, 1.13
See application file for complete search history.

(56) References Cited

U.S. PATENT DOCUMENTS

| | | | |
|---|---|---|---|
| 5,768,516 A | 6/1998 | Sugishima | |
| 5,813,348 A | 9/1998 | Zingher | |
| 6,009,804 A * | 1/2000 | Yamada | 101/2 |
| 6,092,114 A | 7/2000 | Shaffer et al. | |
| 7,256,909 B2 * | 8/2007 | Gomi | 358/1.18 |
| 2002/0030851 A1 * | 3/2002 | Wanda | 358/1.15 |
| 2003/0007175 A1 * | 1/2003 | Tsuda et al. | 358/1.15 |
| 2003/0053082 A1 * | 3/2003 | Tomito et al. | 358/1.2 |
| 2007/0279685 A1 | 12/2007 | Tsuda et al. | |

FOREIGN PATENT DOCUMENTS

| | | |
|---|---|---|
| EP | 0 950 969 | 10/1999 |
| EP | 1 276 041 | 1/2003 |
| JP | 5-2541 | 1/1993 |
| JP | 9-321929 | 12/1997 |
| JP | 11-296332 | 10/1999 |
| JP | 11-327845 A | 11/1999 |
| JP | 2000-339126 | 12/2000 |
| JP | 2001-117736 A | 4/2001 |
| JP | 2003-76521 | 3/2003 |

* cited by examiner

Primary Examiner—Edward L Coles
Assistant Examiner—Vincent Rudolph
(74) Attorney, Agent, or Firm—Brian M. McGuire; Matthew K. Ryan; Frommer Lawrence & Haug LLP

(57) ABSTRACT

Desired application data can be printed in a desired printing condition even if a computer being used does not have appropriate application software or a printer driver installed therein. Each of proxy printing transmission units sends proxy printing request information comprising the application data to be printed and printing setting information as the printing condition to a network. Each of proxy printing judgment and processing units receives the proxy printing request information from the network, and compares the proxy printing request information with proxy printing enabling information comprising the type of application software and printing enabling setting information in a printer driver installed in a corresponding one of computers. If the proxy printing enabling information matches the proxy printing request information, the application data are sent to the computer having the match and converted into PDL data that are printed from a corresponding printer.

4 Claims, 15 Drawing Sheets

FIG.2

Application Data
(Applicatin Software 11C) } 14

| Paper Size = A4 |
| Paper orientation = Portrait |
| Face = Duplex |
| Color = Monochrome |
| Printer Type = Laser Printer |
| Resolution = over 1200dpi |
| Printing Speed = over 120ppm |
| nUP = 1up |

PRINTING SETTING INFORMATION GENERATION

| PAPER SIZE | A4 ▼ |
| RESOLUTION | 600×600 ▼ |
| PRINTING SPEED | 120ppm ▼ |
| ××× | ××× ▼ |
| ××× | ××× ▼ |
| ××× | ××× ▼ |

[ OK ] [ CANCEL ]

FIG.4

Application
    Applicatin Software 11A
    Applicatin Software 11B      }17A

| |
|---|
| Paper Size = A4, A3 |
| Paper orientation = Portrait, Landscape |
| Face = Simplex |
| Color = Monochrome |
| Printer Type = Laser Printer |
| Resolution = over 1200dpi |
| Printing Speed = 120ppm |
| nUP = over 4up |

}19A

}18A (PRINTER DRIVER 12B)

FIG.5

Application
　　　Applicatin Software 11A　　　　　　　　}17B

| Paper Size = A4 |
| Paper orientation = Portrait, Landscape |
| Face = Duplex |
| Color = Monochrome |
| Printer Type = Laser Printer |
| Resolution = over 1200dpi |
| Printing Speed = 120ppm |
| nUP = over 4up |

(PRINTER DRIVER 12A)

}19B

| Paper Size = A4, A3 |
| Paper orientation = Portrait, Landscape |
| Face = Simplex |
| Color = Monochrome |
| Printer Type = Laser Printer |
| Resolution = over 1200dpi |
| Printing Speed = 120ppm |
| nUP = over 4up |

(PRINTER DRIVER 12B)

Application
    Applicatin Software 11A
    Applicatin Software 11C      }17C

| |
|---|
| Paper Size = A4 |
| Paper orientation = Portrait, Landscape |
| Face = Duplex |
| Color = Monochrome |
| Printer Type = Laser Printer |
| Resolution = over 1200dpi |
| Printing Speed = 120ppm |
| nUP = over 4up |

(PRINTER DRIVER 12A)

| |
|---|
| Paper Size = A4, A3 |
| Paper orientation = Portrait, Landscape |
| Face = Simplex |
| Color = Monochrome |
| Printer Type = Laser Printer |
| Resolution = over 1200dpi |
| Printing Speed = 120ppm |
| nUP = over 4up |

(PRINTER DIRVER 12B)

}19C

}18C

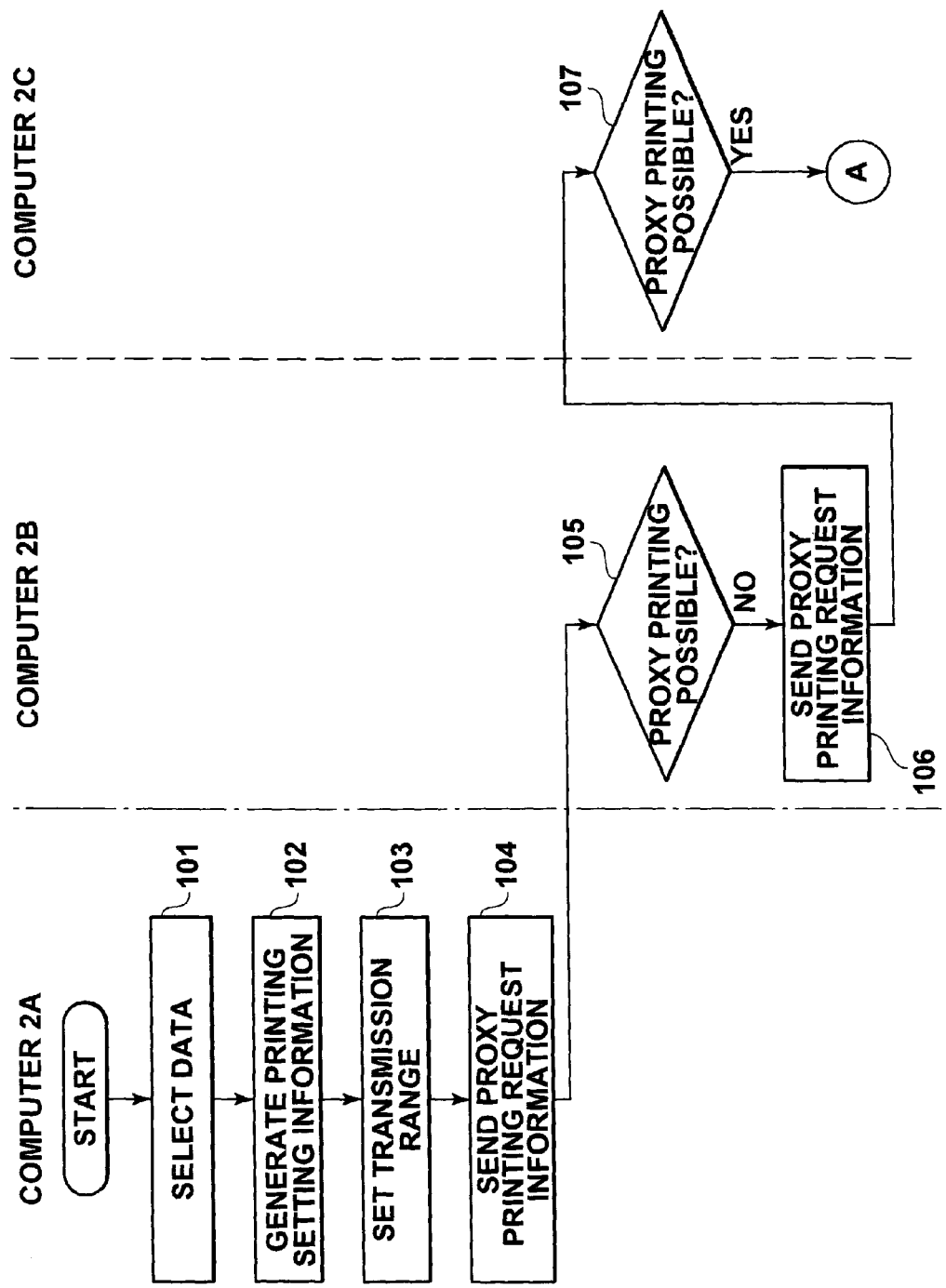

FIG.11
(1)
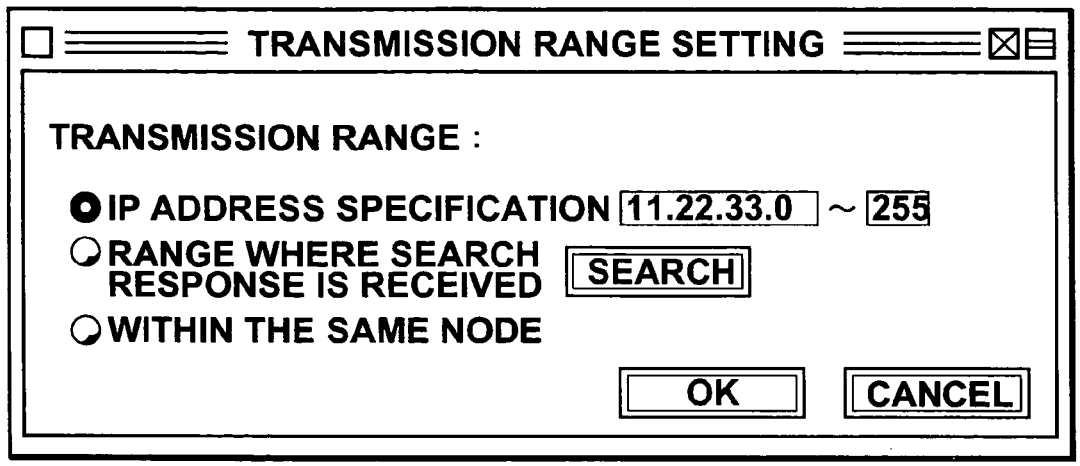
(2)
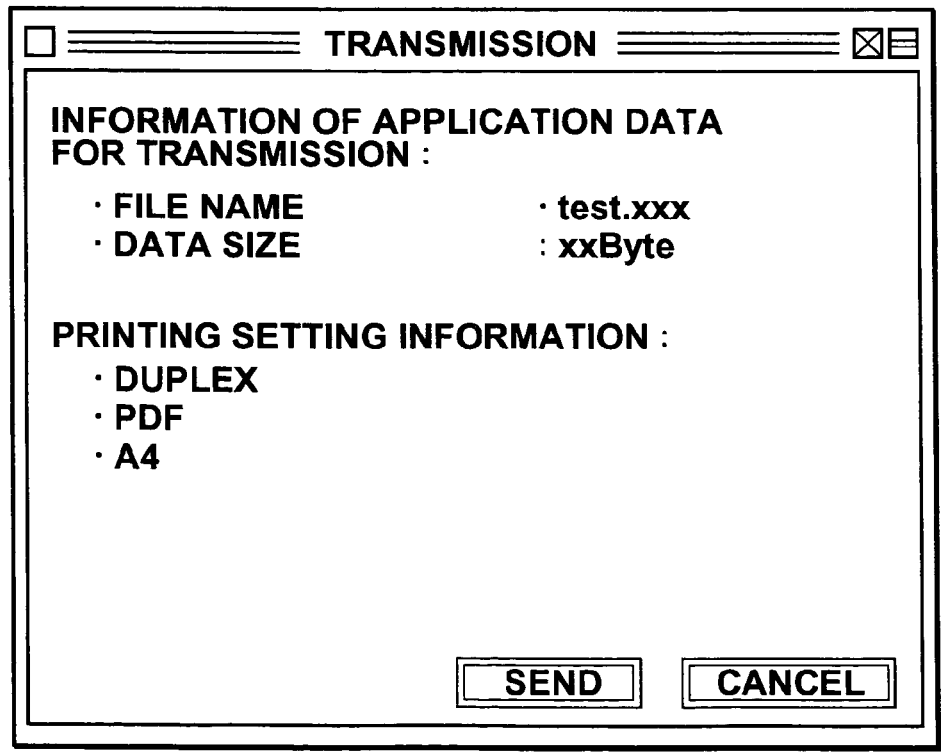

FIG.12

TRANSMISSION

INFORMATION OF APPLICATION DATA FOR TRANSMISSION :
- FILE NAME : test.xxx
- DATA SIZE : xxByte PRINTING SETTING INFORMATION :
- PAPER SIZE    xxx
- RESOLUTION    xxx
- PRINTING SPEED    xxx

INFORMATION OF COMPUTERS WHERE PROXY PRINTING IS AVAILABLE — 2B(2C)

| PC NAME | IP ADDRESSES |
|---|---|
| PC001 | 11.22.33.11 |
| PC002 | 11.22.33.22 |
| PC003 | 11.22.33.33 |

[SEND] [CANCEL]

FIG.13

Used Application
    Application Software 11C    }27

| |
|---|
| Paper Size = A4 |
| Paper orientation = Portrait |
| Face = Duplex |
| Color = Monochrome |
| Printer Type = Laser Printer |
| Resolution = over 1200dpi |
| Printing Speed = over 120ppm |
| nUP = 4up |

}28

}15

NETWORK PRINTING SYSTEM FOR PROXY PRINTING

BACKGROUND OF THE INVENTION

1. Field of the Invention

The present invention relates to a network printing system. More specifically, the present invention relates to a network printing system that can easily carry out printing by using a network printer without a special server therefor.

2. Description of the Related Art

In a conventional network printing system, when desired data used in application software (hereinafter referred to as application data) are printed in a desired printing condition by using a computer connected to a network, the computer needs to be installed with application software appropriate for the desired application data and a printer driver appropriate for the desired printing condition.

In order to prevent such inconvenience, a network printing system has been proposed wherein a computer can issue an instruction to print desired application data without installation of application software for the desired application data therein, by using a dedicated PDL generation server on a network (see Japanese Unexamined Patent Publication No. 2001-117736).

Another network printing system has also been proposed for enabling printing without consideration of a printer driver (see Japanese Unexamined Patent publication No. 11(1999)-327845). In this system, a printer server connected to a plurality of printers and having a printer driver of common PDL is installed on a network, and data are sent from the printer server to an optimal one of the printers. In this manner, printing can be carried out without consideration of a printer driver installed in a computer being used by a user.

However, in the network printing system described in Japanese Unexamined Patent Publication No. 2001-117736, the dedicated PDL generation server needs to be installed in the system. In addition, access is concentrated on the PDL generation server from a plurality of computers, which leads to deterioration in efficiency of data conversion into PDL.

Furthermore, in the network printing system described in Japanese Unexamined Patent publication No. 11(1999)-327845, the special printer server is necessary. Therefore, the problem of deteriorating efficiency also occurs due to concentrated access to the printer server. Furthermore, application software appropriate for the desired application data is necessary in the computer issuing an instruction to print the data, which is inconvenient.

SUMMARY OF THE INVENTION

The present invention has been conceived based on consideration of the above circumstances. An object of the present invention is therefore to provide a network printing system capable of printing desired application data in a desired printing condition without a special apparatus installed on a network in the case where application software appropriate for the desired application data and a printer driver appropriate for the desired printing condition are not installed in a computer being used.

A network printing system of the present invention is a network printing system wherein at least one printer and a plurality of computers are connected to a network, and the network printing system is characterized by that at least one of the computers has a proxy printing transmission unit for sending application data and printing setting information as a printing condition for the application data to the network, and at least another one of the computers has application software appropriate for the application data;

a printer driver appropriate for the printing setting information and for the printer or printers; and a proxy printing processing unit for receiving the application data and the printing setting information from the network, for generating printing data from the application data, and for carrying out proxy printing whereby the printing data are printed from the printer or one of the printers.

The application software appropriate for the application data refers to application software that can print the application data, and is not limited to application software used when the application data are generated. The application software appropriate for the application data may be application software such as a viewer that can enable only display and printing.

In the network printing system of the present invention, the computer or the computers having the proxy printing processing unit may have a proxy printing transmission unit for sending application data and printing setting information as a printing condition for the application data to the network, and at least one of the computers excluding the computers having the proxy printing processing unit and the proxy printing transmission unit has application software appropriate for the application data;

a printer driver appropriate for the printing setting information and for the printer or printers; and a proxy printing processing unit for receiving the application data and the printing setting information from the network, for generating printing data from the application data, and for carrying out proxy printing whereby the printing data are printed from the printer or one of the printers.

In the case where the computer or computers having the proxy printing transmission unit have a proxy printing requesting unit for sending proxy printing request information including an application type of the application data and the printing setting information to the network, the computer or computers having the proxy printing processing unit preferably have a proxy printing judgment unit for receiving the proxy printing request information from the network, for comparing the proxy printing request information with proxy printing enabling information including an application type and printing enabling setting information in the printer driver in the corresponding computer having the proxy printing processing unit, and for determining to carry out the proxy printing in the case where the proxy printing enabling information matches the proxy printing request information. The proxy printing request information may include the application data.

The case where the proxy printing enabling information matches the proxy printing request information refers to the case where the proxy printing enabling information satisfies conditions in the proxy printing request information. More specifically, the application type included in the proxy printing enabling information includes the application software that can print application data generated by the application type included in the proxy printing request information while the printing enabling setting information included in the proxy printing enabling information satisfies a condition in the printing setting information included in the proxy printing request information.

In the case where the computer or computers having the proxy printing processing unit have a proxy printing enabling information notification unit for sending proxy printing enabling information including an application type and printing enabling setting information in a printer driver in the computer or computers to the computer or computers having the proxy printing transmission unit, the computer or computers having the proxy printing transmission unit preferably have a proxy printing selection unit for comparing the proxy printing enabling information that has been received with proxy printing request information including an application type of the application data and the printing setting information, and for causing the computer or one of the computers having the proxy printing processing unit to carry out the proxy printing in the case where the proxy printing enabling information matches the proxy printing request information.

A program of the present invention is a program used in a network printing system wherein at least one printer and a plurality of computers are connected to a network. In the network printing system, one of the computers requests proxy printing of application data in a predetermined printing condition from another one of the computers having:

application software appropriate for the application data;

a printer driver appropriate for the printing condition and for the printer or printers; and a proxy printing processing unit for receiving the application data and printing setting information as the printing condition from the computer requesting the proxy printing via the network, for generating printing data based on the application data by using the application software, and for carrying out the proxy printing whereby the printing data are printed from the printer or one of the printers. The program of the present invention causes the computer requesting the proxy printing to function as proxy printing transmission means for sending the application data and the printing setting information to the computer having the proxy printing processing unit via the network.

Another program of the present invention is a program used in a network printing system wherein at least one printer and a plurality of computers are connected to a network. In the network printing system, one of the computers carries out proxy printing of application data in a predetermined printing condition, based on a proxy printing request of another one of the computers for the proxy printing of the application data in the printing condition. The computer requesting the proxy printing has a proxy printing transmission unit for sending the application data and printing setting information as the printing condition to the computer that carries out the proxy printing, via the network. This program of the present invention causes the computer that carries out the proxy printing to function as a proxy printing processing unit for receiving the application data and the printing setting information from the computer requesting the proxy printing via the network, for generating printing data by using application software appropriate for the application data, and for carrying out the proxy printing whereby the printing data are printed from the printer or one of the printers.

According to the network printing system of the present invention, the network connects the computer or computers having the proxy printing transmission unit for sending the application data and the printing setting information as the printing condition for the application data to the network, and the computer or computers having the application software appropriate for the application data, the printer driver appropriate for the printing setting information and for the printer or printers, and the proxy printing processing unit for receiving the application data and the printing setting information from the network and for generating the printing data from the application data as well as for carrying out the proxy printing whereby the printing data are printed from the printer or one of the printers. Therefore, in the case where desired application data are printed in a desired printing condition by using the computer or one of the computers having the proxy printing transmission unit, the printing can be carried out without a special apparatus on the network by sending the desired application data and the desired printing condition to the computer or one of the computers having the proxy printing processing unit even if no application software appropriate for the desired application data or no printer driver appropriate for the desired printing condition is installed in the computer having the proxy printing transmission unit.

If the computer having the proxy printing processing unit or at least one of the computers having the proxy printing processing unit has the proxy printing transmission unit for sending the application data and the printing setting condition as the printing condition for the application data to the network, and if at least one of the computers excluding the computers having the proxy printing processing unit and the proxy printing transmission unit has the application software appropriate for the application data, the printer driver appropriate for the printing setting information and for the printer or printers, and the proxy printing processing unit for receiving the application data and the printing setting information from the network and for generating the printing data from the application data as well as for carrying out the proxy printing whereby the printing data are printed from the printer or one of the printers, concentration of printing data generation processing on one of the computers can be prevented, which improves efficiency.

If the computer or computers having the proxy printing transmission unit have the proxy printing requesting unit for sending the proxy printing request information including the application type of the application data and the printing setting information to the network and if the computer or computers having the proxy printing processing unit have the proxy printing judgment unit for receiving the proxy printing request information from the network and for comparing the proxy printing request information with the proxy printing enabling information including the application type and the printing enabling setting information in the printer driver of the computer or computers having the proxy printing processing unit as well as for determining execution of the proxy printing if the proxy printing enabling information matches the proxy printing request information, the proxy printing requesting unit does not need to select the computer to execute the proxy printing. Therefore, the configuration of the proxy printing requesting unit can be simplified. If the proxy printing request information includes the application data, the application data do not need to be sent after judgment as to whether or not the proxy printing can be carried out. In this manner, a processing speed for the proxy printing can be increased.

If the computer or computers having the proxy printing processing unit have the proxy printing enabling information notification unit for sending the proxy printing enabling information including the application type and the printing setting information in the printer driver therein to the computer or computers having the proxy printing transmission unit, and if the computer or computers having the proxy printing transmission unit have the proxy printing selection unit for comparing the proxy printing enabling information with the proxy printing request information including the application type of the application data and the printing setting information and for determining execution of the proxy printing by the computer or one of the computers having the proxy printing processing unit in the case where the proxy printing enabling information matches the proxy printing request information, the proxy printing enabling information notification unit does not need to judge whether or not the proxy printing is carried out. Therefore, the configuration of the proxy printing enabling information notification unit can be simplified.

Note that the programs according to the present invention may be provided recorded on computer readable media. Those who are skilled in the art would know that computer readable media are not limited to any specific type of device, and include, but are not limited to: floppy disks, CD's, RAM's, ROM's, hard disks, magnetic tapes, and internet downloads, in which computer instructions can be stored and/or transmitted. Transmission of the computer instructions through a network or through wireless transmission means is also within the scope of this invention. Additionally, computer instructions include, but are not limited to: source, object and executable code, and can be in any language, including higher level languages, assembly language, and machine language.

BRIEF DESCRIPTION OF THE DRAWINGS

FIG. 2 shows an example of proxy printing request information;

FIG. 3 shows a printing setting information generation window;

FIG. 4 shows proxy printing enabling information stored in the computer 2A (22A, 32A, 42A);

FIG. 5 shows proxy printing enabling information stored in the computer 2B (22B, 32B, 42B);

FIG. 6 shows proxy printing enabling information stored in the computer 2C (22C, 32C, 42C);

FIG. 7 and FIG. 8 is a flow chart showing a procedure of a first embodiment of the present invention;

FIG. 11(1) shows a transmission range setting window;

FIG. 11(2) shows a window wherein a content of application data is displayed;

FIG. 12 shows a window wherein computers enabling printing are displayed;

FIG. 13 shows another example of proxy printing request information;

DESCRIPTION OF THE PREFERRED EMBODIMENTS

Figure 1:
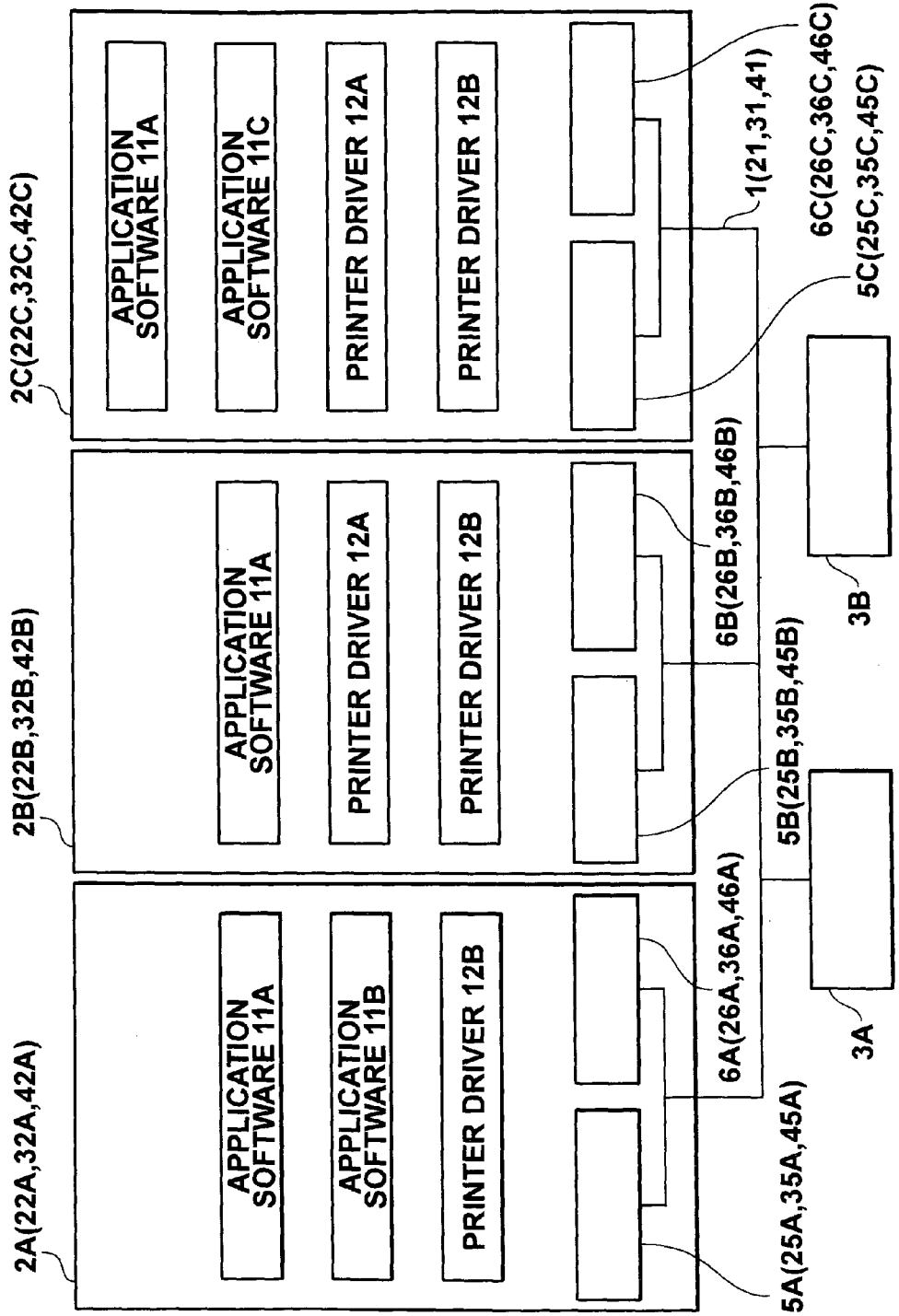
FIG. 1 shows the configuration of a network printing system of embodiments of the present invention.

Hereinafter, embodiments of the present invention will be explained with reference to the accompanying drawings. FIG. 1 shows the configuration of a network printing system of a first embodiment of the present invention. As shown in FIG. 1, computers 2A, 2B, and 2C as well as printers 3A and 3B are connected to a network 1.

In this system, each of the computers 2A~2C sends proxy printing request information including application data as a target of printing and printing setting information as printing conditions for the application data to the network 1, and receives the proxy printing request information sent by the other computers from the network 1. Each of the computers 2A~2C compares the proxy printing request information with proxy printing enabling information comprising the type of application software and printing enabling setting information in a printer driver therein. Each of the computers 2A~2C carries out proxy printing whereby the application data are converted into PDL data and printed by one of the printers corresponding thereto in the case where the proxy printing enabling information matches the proxy printing request information.

As shown in FIG. 1, each of the computers 2A~2C has the application software and the printer driver installed therein. Each of the computers 2A~2C comprises a proxy printing transmission unit 5A~5C connected to the network 1, and a proxy printing judgment and processing unit 6A~6C. The computer 2A has application software 11A and application software 11B, and a printer driver 12B for the printer 3B. The computer 2B has the application software 11A and a printer driver 12A for the printer 3A as well as the printer driver 12B. The computer 2C has the application software 11A, application software 11C, and the printer drivers 12A and 12B.

Each of the proxy printing transmission units 5A~5C sends the proxy printing request information comprising the application data as the target of printing and the printing setting information as the printing conditions for the application data, to the network 1.

An example of the proxy printing request information is shown in FIG. 2. Proxy printing request information 16 is generated each time a user wishes to carry out printing. The user specifies application data 14 to be printed, by using one of the computers. The application data 14 to be printed can be specified by a file thereof, and the computer the user is using is not necessarily installed with the application software that can print the application data 14.

The user generates printing setting information 15 as the printing conditions for the application data 14. At this time, a printing setting information generation window such as a window shown in FIG. 3 is displayed on the computer of the user, and the printing setting information 15 is generated by selection from a pull-down menu or direct input, for example. The printing setting information 15 is not necessarily limited to the information shown in FIG. 2, and only a portion of the information shown in FIG. 2 or more detailed information may be used as the printing setting information 15.

Each of the proxy printing judgment and processing unit 6A~6C receives the proxy printing request information 16 sent by the other computers from the network 1, and compares the proxy printing request information 16 with the proxy printing enabling information comprising the application type and the printing enabling setting information in the printer driver therein. In the case where the proxy printing enabling information matches the proxy printing request information 16, the application data 14 received by the computer whose proxy printing enabling information matches the proxy printing request information are converted into the PDL data and printed by the corresponding one of the printers. The proxy printing judgment and processing unit 6A of the computer 2A stores proxy printing enabling information 19A shown in FIG. 4, while the proxy printing judgment and processing unit 6B of the computer 2B stores proxy printing enabling information 19B shown in FIG. 5. In addition, the proxy printing judgment and processing unit 6C of the computer 2C stores proxy printing enabling information 19C shown in FIG. 6. It is necessary for printing enabling setting information 18A~18C in FIGS. 4 to 6 to include information corresponding to the printing setting information 15. Therefore, if the printing setting information 15 includes detailed information, the printing enabling setting information 18A~18C needs to include the information corresponding thereto.

A procedure carried out in the system will be explained with reference to flow charts shown in FIGS. 7 and 8. For the sake of simpler explanation, the case will be explained where the user using the computer 2A carries out duplex printing of the application data 14 generated by the application software 11C on A4-sized printing paper.

The user specifies the application data 14 to be printed, by using the computer 2A at Step 101.

The user then generates the printing setting information 15 as the printing conditions for the application data 14 at Step 102. As a result, the proxy printing request information 16 shown in FIG. 2 is generated in the proxy printing transmission unit 5A.

Figure 9:
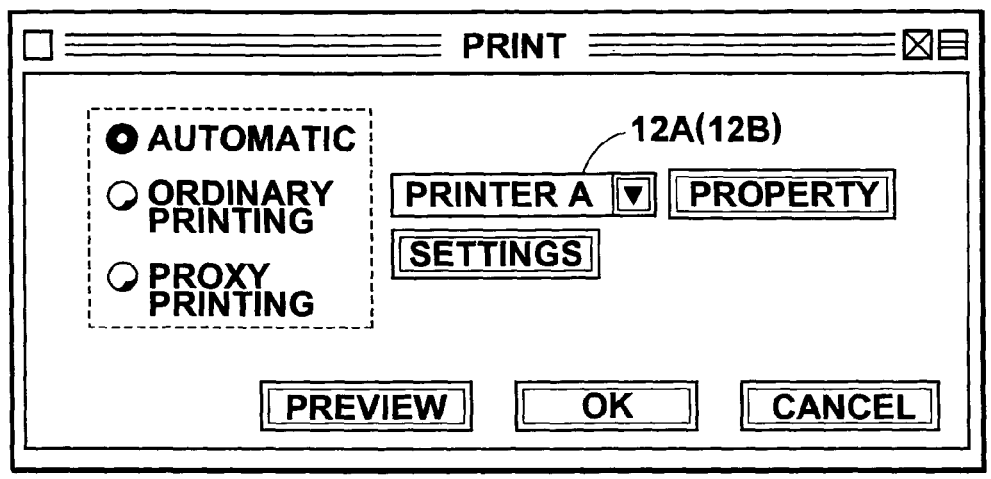
FIG. 9 shows a printing window.
Figure 10:
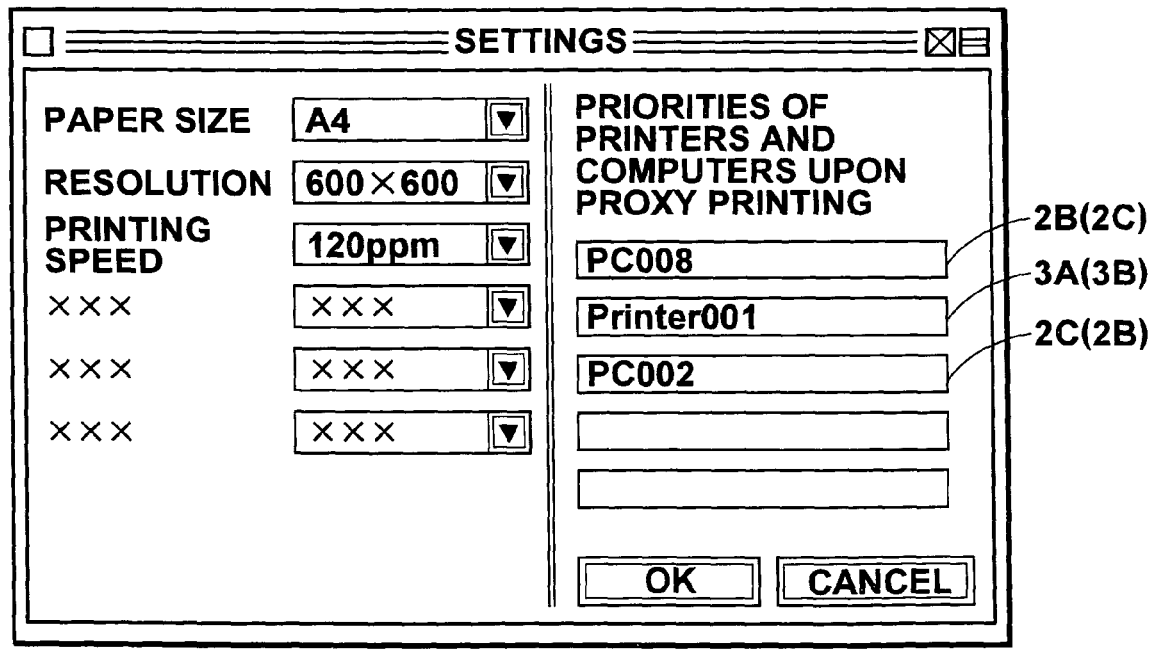
FIG. 10 shows a proxy printing setting window.

The user further carries out selection from "ordinary printing", "proxy printing", and "automatic" (surrounded by a broken line in FIG. 9) in a printing window shown in FIG. 9. In "ordinary printing", the application data 14 are printed by the computer 2A itself. In "proxy printing", either the computer 2B or 2C carries out proxy printing of the application data 14 according to a predetermined setting. For example, priority can be set regarding the computers 2B and 2C used for proxy printing, by using a window shown in FIG. 10.

If "automatic" is selected, printing by the computer 2A has priority. However, in the case where the computer 2A cannot carry out printing or a load thereon is too heavy, proxy printing is requested of the computer 2B or 2C. In this manner, the user does not need to specify ordinary printing or proxy printing each time he/she needs to print.

In the case where proxy printing is requested, the proxy printing request information 16 is sent according to the setting shown in FIG. 9, at Step 103. At this time, a window for setting a transmission range is displayed as shown in FIG. 11(1) for specification of the computers 2B and 2C by IP addresses thereof. The proxy printing request information 16 is then sent within the transmission range. As the transmission range, the range specified by the IP addresses or a range within the same node (such as a range in a LAN divided by a switch or a router, for example) may be used. As shown in FIG. 11(2), the content of the application data to be sent may be confirmed.

Alternatively, the computers that can carry out proxy printing may be detected in advance so that a list of the computers can be displayed as shown in FIG. 12 for confirmation of the computers 2B and 2C (a part displayed in highlight) that carry out printing with priority.

At Step 104, the proxy printing transmission unit 5A of the computer 2A sends the proxy printing request information 16 to the proxy printing judgment and processing unit 6B of the computer 2B as a first destination. A destination list is also sent at the same time. As a method of sending the proxy printing request information 16, a virtual printer driver may be used so that a "Print" button can be clicked for the transmission. Alternatively, application software that can directly send the file of the desired application data may be used. In addition, e-mail software may be used for printing the application data attached to an e-mail message.

At Step 105, the proxy printing judgment and processing unit 6B of the computer 2B receives the proxy printing request information 16, and compares the proxy printing enabling information 19B stored in the computer 2B with the proxy printing request information 16. In this case, the computer 2B does not have the application software appropriate for the application data 14. Therefore, the proxy printing judgment and processing unit 6B judges that the proxy printing enabling information 19 does not match the proxy printing request information 16.

At Step 106, the proxy printing judgment and processing unit 6B in the computer 2B refers to the destination list, and sends the proxy printing request information 16 to the proxy printing judgment and processing unit 6C of the computer 2C as the next destination.

At Step 107, the proxy printing judgment and processing unit 6C of the computer 2C receives the proxy printing request information 16, and compares the proxy printing request information 16 with the proxy printing enabling information 19C stored in the computer 2C. In this case, the computer 2C has the application software 11C appropriate for the application data 14, and the printing setting information 15 matches a part corresponding to the printer driver 12A in the printing enabling setting information 18C. Therefore, the proxy printing enabling information 19C is judged to match the proxy printing request information 16. In the case where the proxy printing enabling information 19C is not judged to match the proxy printing request information 16, the computer 2A is notified of the fact that printing is impossible.

At Step 108, the proxy printing judgment and processing unit 6C of the computer 2C starts the application software 11C that is appropriate for the application data 14. At Step 109, the proxy printing judgment and processing unit 6C selects the printer driver 12A appropriate for the printing setting information 15. At Step 110, the proxy printing judgment and processing unit 6C generates the PDL data from the application data 14. Thereafter, the proxy printing judgment and processing unit 6C stops the application software 11C and the printer driver 12A. At Step 111, the proxy printing judgment and processing unit 6C sends the PDL data to the printer 3A.

At Step 112, the printer 3A receives the PDL data. The printer 3A sends a proxy printing completion notification to the computer 2C at Step S113. The computer 2C receives the proxy printing completion notification at Step 114, and sends the proxy printing completion notification to the computer 2A at Step 115. The computer 2A receives the proxy printing completion notification at Step 116, and the printer 3A carries out the printing at Step 117. At Step 118, the printer 3A sends a printing completion notification to the computer 2A. The computer 2A receives the printing completion notification at Step 119.

As is clear from the explanations in the above, in the network printing system in this embodiment, printing of the desired application data can be carried out at the desired printing conditions with use of any one of the computers 2A~2C through transmission of the proxy printing request information 16 to the other computers without a special apparatus on the network 1 even if the computer being used by the user does not have the application software appropriate for the application data or the printer driver appropriate for the printing conditions.

Furthermore, since each of the computers 2A~2C has the proxy printing transmission unit 5A~5C and the proxy printing judgment and processing unit 6A~6C, processing for generating the PDL data is not concentrated on a specific one of the computers, which leads to an efficiency improvement.

Moreover, since the computers 2A~2C respectively have the proxy printing judgment and processing units 6A~6C, the proxy printing transmission units 5A~5C do not need to select the computer to carry out the proxy printing. Therefore, the configuration thereof can be simpler. In addition, since the proxy printing request information 16 includes the application data 14, proxy printing can be carried out immediately after judgment on capability of the proxy printing. In this manner, a proxy printing processing speed can be increased.

Figure 14:
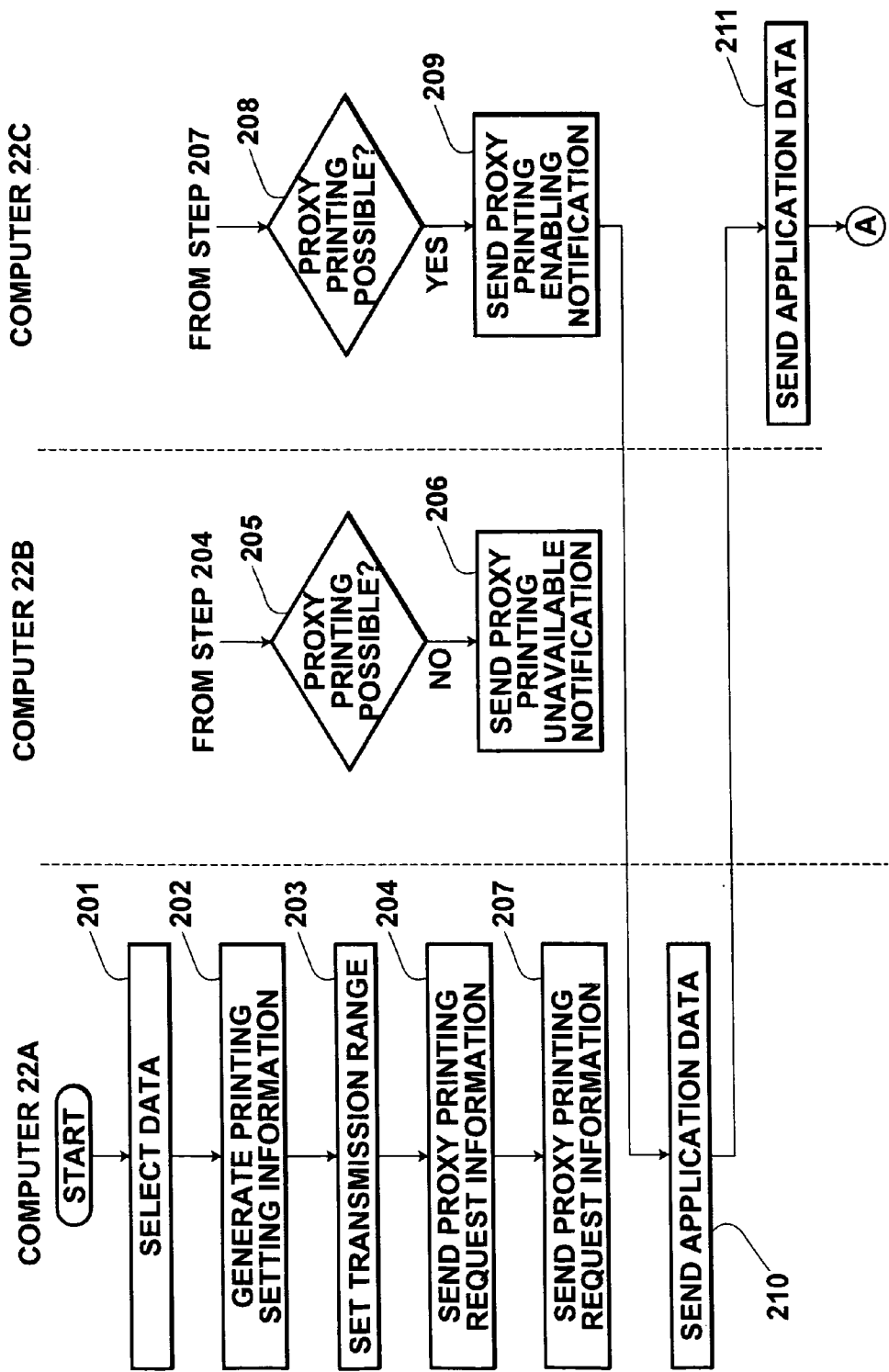
FIG. 14 is a flow chart showing a procedure of a second embodiment of the present invention.

A second embodiment of the present invention will be explained with reference to FIGS. 1, 13, and 14. In the second embodiment, the configuration thereof is almost the same as the first embodiment. Therefore, only components that are different from those in the first embodiment have reference numbers shown in FIG. 1. As shown in FIG. 1, a network 21 is connected to computers 22A~22C and the printers 3A and 3B.

In this system, each of the computers 22A~22C sends proxy printing request information comprising an application type as the type of application data and printing setting information as printing conditions for the application data to the network 21 before sending the application data as a printing target. Each of the computers 22A~22C also receives the proxy printing request information sent by the other computers from the network 1, and compares the proxy printing request information with proxy printing enabling information comprising the type of application software and printing enabling setting information in a printer driver therein. In the case where the proxy printing enabling information matches the proxy printing request information, the computer having the match sends a proxy printing enabling notification to the computer that sent the proxy printing request information. The computer that sent the proxy printing request information receives the proxy printing enabling notification, and sends the application data as the printing target to the computer that sent the proxy printing enabling notification. The computer that sent the proxy printing enabling notification converts the application data into PDL data and carries out proxy printing by using the printer corresponding thereto.

As shown in FIG. 1, each of the computers 22A~22C has the application software and the printer driver installed therein. The computers 22A~22C respectively comprise proxy printing requesting transmission units 25A~25C and proxy printing judgment and processing units 26A~26C connected to the network 21. The computer 22A has the application software 11A and the application software 11B, and the printer driver 12B for the printer 3B. The computer 22B has the application software 11A and the printer driver 12A for the printer 3A as well as the printer driver 12B. The computer 22C has the application software 11A, the application software 11C, and the printer drivers 12A and 12B.

Each of the proxy printing requesting transmission units 25A~25C sends to the network 21 proxy printing request information 28 comprising an application type 27 of the application data as the printing target and the printing setting information 15 as the printing conditions for the application data. The proxy printing request information 28 is generated each time a user wishes to carry out printing. The user specifies the application data to be printed, by using one of the computers. The user then generates the printing setting information 15 in the same manner as the first embodiment. The proxy printing request information 28 can be generated, since the application type 27 of the application data is known by specification of the application data. Upon reception of the proxy printing enabling notification from any one of the proxy printing judgment and processing units 26A~26C that will be explained later, the proxy printing requesting transmission unit 25A~25C that received the proxy printing enabling notification sends the application data to the computer that sent the proxy printing enabling notification.

Each of the proxy printing judgment and processing units 26A~26C receives the proxy printing request information 28 sent by the other computers from the network 21, and compares the proxy printing request information 28 with the proxy printing enabling information comprising the application type and the printing enabling setting information in the printer driver therein. In the case where the proxy printing enabling information matches the proxy printing request information 28, the proxy printing judgment and processing unit 26A~26C of the computer having the match sends the proxy printing enabling notification to the computer that sent the proxy printing request information 28, and receives the application data 14 therefrom. The proxy printing judgment and processing unit then converts the application data into the PDL data and causes the corresponding printer to carry out printing. As in the first embodiment, the proxy printing judgment and processing unit 26A stores the information shown in FIG. 4 as the proxy printing enabling information 19A, while the proxy printing judgment and processing unit 26B stores the information shown in FIG. 5 as the proxy printing enabling information 19B. At the same time, the proxy printing judgment and processing unit 26C stores the information shown in FIG. 6 as the proxy printing enabling information 19C.

Hereinafter, a procedure in this system will be explained with reference to a flow chart shown in FIG. 14. For the sake of simpler explanation, the case will be explained where the user using the computer 22A carries out duplex printing of the application data 14 generated by the application software 11C on A4-sized printing paper.

The user specifies whether printing is carried out by the computer he/she is using or by another one of the computers, and the range wherein proxy printing is requested if proxy printing is carried, in the same manner as in the first embodiment. Therefore, detailed explanations thereof will be omitted, and only the procedure of proxy printing will be explained below.

At Step 201, the user specifies the application data 14 to be printed, by using the computer 22A.

At Step 202, the user generates the printing setting information 15 as the printing conditions for the application data 14. As a result, the proxy printing request information 28 shown in FIG. 13 (comprising the application type 27 and the printing setting information 15) is generated in the proxy printing requesting transmission unit 25A.

At Step 203, the computers 22B and 22C are specified as the transmission range wherein the proxy printing request information 28 is sent.

At Step 204, the proxy printing requesting transmission unit 25A in the computer 22A sends the proxy printing request information 28 to the proxy printing judgment and processing unit 26B of the computer 22B as a first destination. The proxy printing requesting transmission unit 25A of the computer 22A is configured in such a manner that the proxy printing requesting transmission unit 25A sends the proxy printing request information 28 to the next destination in the case where the proxy printing requesting transmission unit 25A receives a proxy printing unavailable notification indicating that the proxy printing is not possible or in the case where the proxy printing requesting transmission unit 25A does not receive within a predetermined amount of time the proxy printing enabling notification representing the fact that the proxy printing is possible. Therefore, even in the case where neither the proxy printing enabling notification nor the proxy printing unavailable notification is received due to the computer as the destination is not operating, for example, the proxy printing request information 28 can be sent to the next destination after the predetermined time has elapsed.

At Step 205, the proxy printing judgment and processing unit 26B of the computer 22B receives the proxy printing request information 28, and compares the proxy printing request information 28 with the proxy printing enabling information 19B stored therein. In this case, since the application software appropriate for the application type 27 is not installed in the computer 22B, the proxy printing enabling information 19B is not judged to match the proxy printing request information 28. Therefore, the proxy printing judgment and processing unit 26B sends the proxy printing unavailable notification at Step 206.

At Step 207, the proxy printing requesting transmission unit 25A of the computer 22A receives the proxy printing unavailable notification, and sends the proxy printing request information 28 to the proxy printing judgment and processing unit 26C of the computer 22C as the next destination. The proxy printing requesting transmission unit 25A then waits for reception of the proxy printing enabling notification for the predetermined amount of time.

At Step 208, the proxy printing judgment and processing unit 26C of the computer 22C receives the proxy printing request information 28, and compares the proxy printing request information 28 with the proxy printing enabling information 19C stored in the computer 22C. In this case, the computer 22C has the application software 11C that is appropriate for the application type 27, and the printing enabling setting information 18C (that is, the part corresponding to the printer driver 12A) matches the printing setting information 15. Therefore, the printing enabling information 19C is judged to match the proxy printing request information 28.

At Step 209, the proxy printing judgment and processing unit 26C sends the proxy printing enabling notification to the proxy printing requesting transmission unit 25A of the computer 22A.

At Step 210, the proxy printing requesting transmission unit 25A of the computer 22A receives the proxy printing enabling notification, and sends the application data 14 to the proxy printing judgment and processing unit 26C of the computer 22C.

At Step S211, the proxy printing judgment and processing unit 26C of the computer 22C receives the application data 14.

Figure 8:
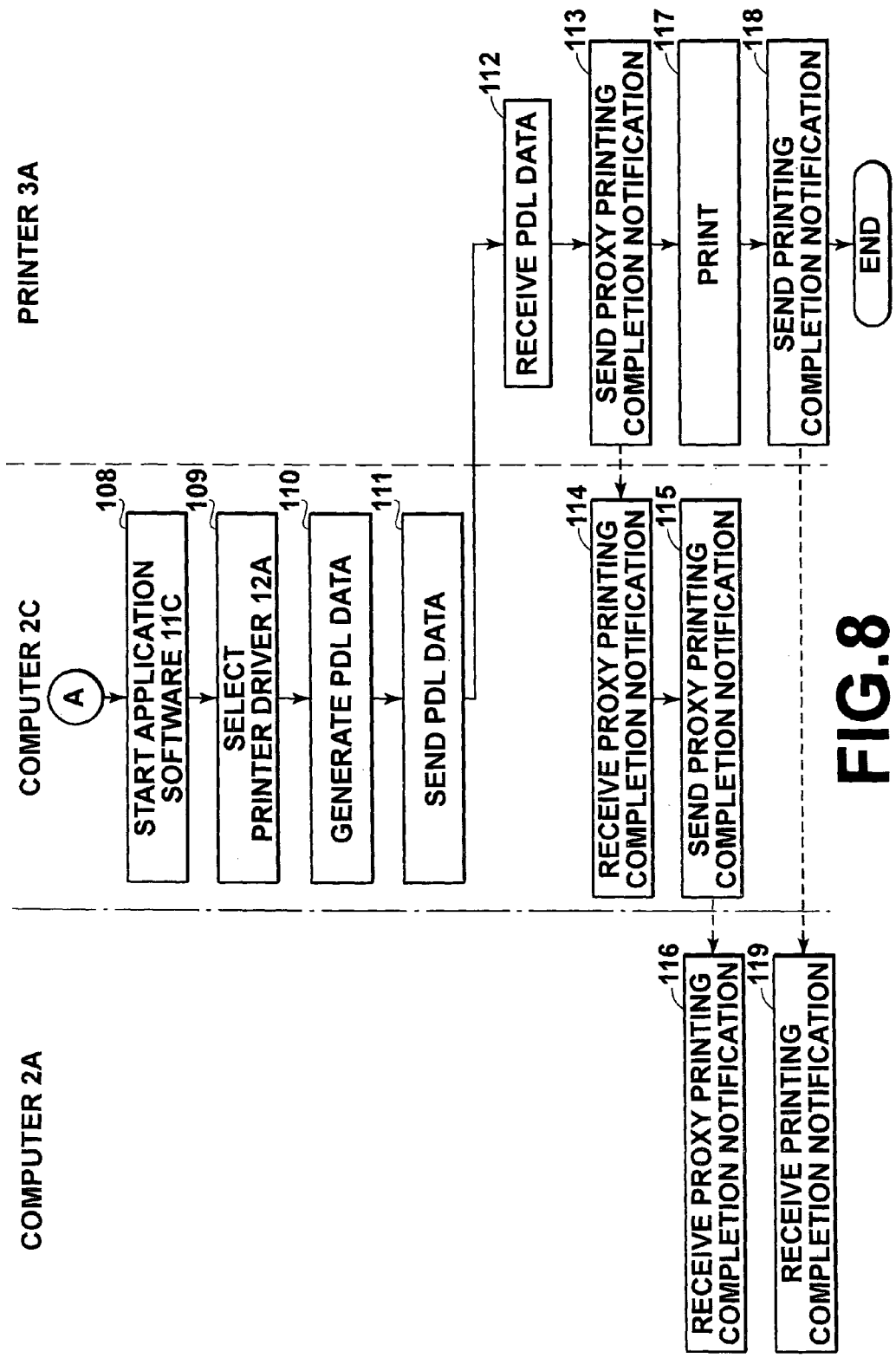

Thereafter, the same steps shown in FIG. 8 are carried out by the computers 22A and 22C, instead of the computers 2A and 2C.

In the case where the proxy printing enabling notification is not received from all the computers in the transmission range, the proxy printing requesting transmission unit 25A displays the fact that the proxy printing is impossible on a display screen of the computer 22A.

As is clear from the above explanation, when the desired application data are printed in the desired printing conditions with use of any one of the computers 22A~22C in the network printing system in this embodiment, the proxy printing request information 28 is sent to the other computers in the case where the computer being used by the user does not have the application software appropriate for the application data or the printer driver appropriate for the printing conditions. The proxy printing enabling notification is received from the computer that can carry out the proxy printing, and the proxy printing can be carried out through transmission of the application data to the computer that can carry out the proxy printing, without a special apparatus on the network 21.

Furthermore, since each of the computers 22A~22C has the proxy printing requesting transmission unit 25A~25C and the proxy printing judgment and processing unit 26A~26C, processing for generating the PDL data is not concentrated on a specific one of the computers, which leads to an efficiency improvement.

Moreover, since the computers 22A~22C respectively have the proxy printing judgment and processing units 26A~26C, the proxy printing requesting transmission units 25A~25C do not need to select the computer to carry out the proxy printing. Therefore, the configuration thereof can be simpler. In addition, since the application data 14 can be sent directly from the computer that requested the proxy printing to the computer that sent the proxy printing enabling notification, the proxy printing can be carried out after only one transmission of the application data having a large size. In this manner, efficiency in use of the network is not lowered.

Figure 15:
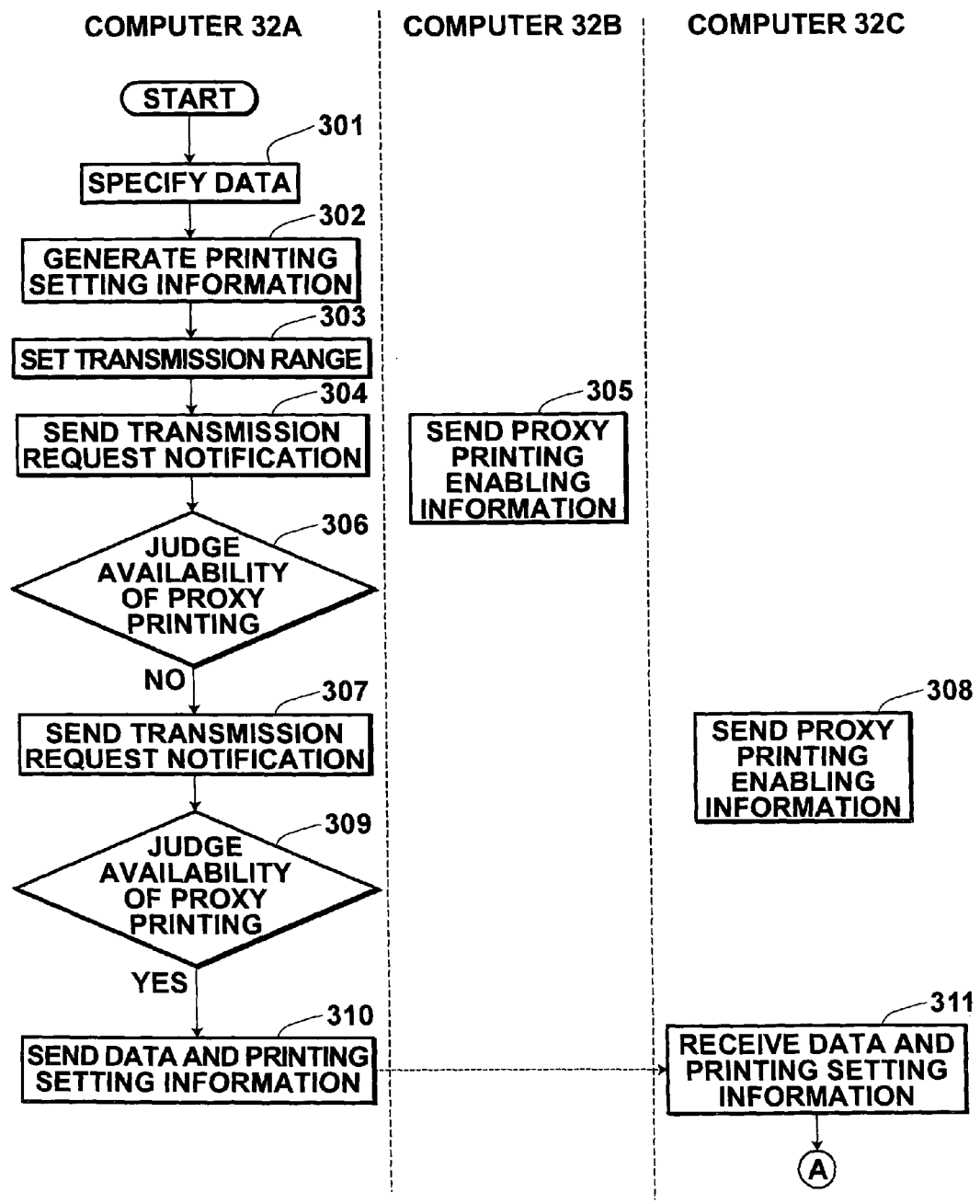
FIG. 15 is a flow chart showing a procedure of a third embodiment of the present invention.
Figure 16:
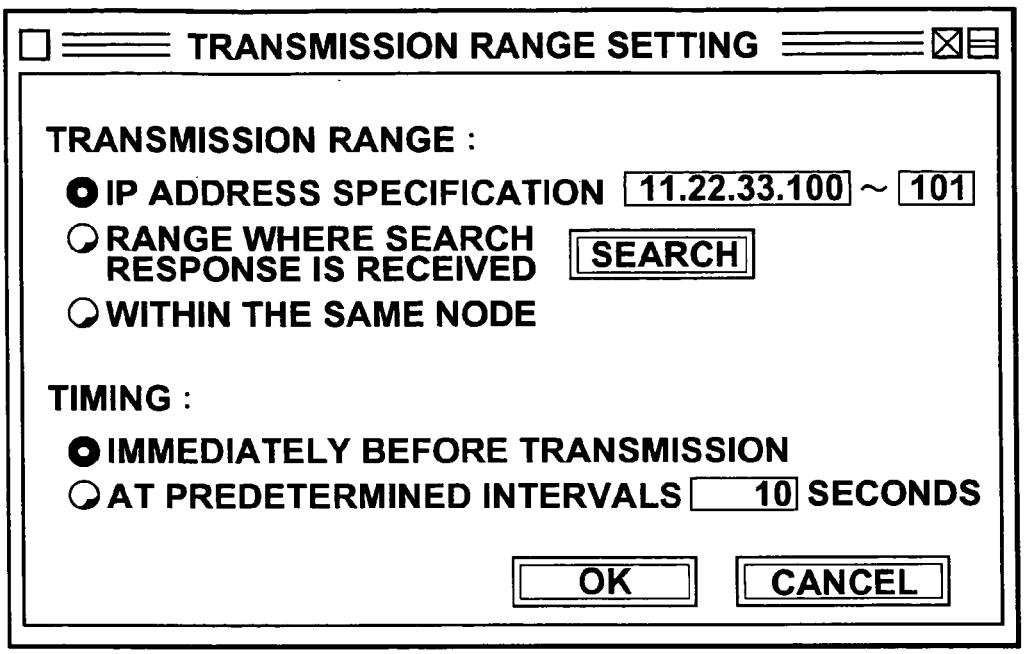
FIG. 16 shows another example of transmission range setting window.

A third embodiment of the present invention will be explained with reference to FIGS. 1, 15, and 16. In the third embodiment, the configuration thereof is almost the same as the first embodiment. Therefore, only components that are different from those in the first embodiment have reference numbers shown in FIG. 1. As shown in FIG. 1, a network 31 is connected to computers 32A~32C and the printers 3A and 3B.

In this system, each of the computers 32A~32C generates proxy printing request information comprising an application type as the type of application data and printing setting information as printing conditions for the application data before sending the application data as a printing target. Each of the computers 32A~32C then receives from the other computers 32A~32C via the network 31 proxy printing enabling information comprising the type of application software and printing enabling setting information in a printer driver therein. In the case where the proxy printing enabling information matches the proxy printing request information, the computer that sent the proxy printing request information sends the application data and the printing setting information to the computer that sent the proxy printing enabling information. The computer that sent the proxy printing enabling information receives the application data, and converts the application data into PDL data. The computer then causes the corresponding one of the printers to carry out printing.

As shown in FIG. 1, each of the computers 32A~32C has the application software and the printer driver installed therein. The computers 32A~32C respectively comprise proxy printing selecting transmission units 35A~35C and proxy printing enabling notification and processing units 36A~36C connected to the network 31. The computer 32A has the application software 11A and the application software 11B, and the printer driver 12B for the printer 3B. The computer 32B has the application software 11A and the printer driver 12A for the printer 3A as well as the printer driver 12B. The computer 32C has the application software 11A, the application software 11C, and the printer drivers 12A and 12B.

Each of the proxy printing selecting transmission units 35A~35C generates the proxy printing request information 28 comprising the application type 27 of the application data as the printing target and the printing setting information 15 as the printing conditions for the application data, as shown in FIG. 13. Thereafter, each of the proxy printing selecting transmission units 35A~35C sends a transmission request notification to the other computers for instructing the other computers to send the proxy printing enabling information.

When each of the proxy printing selecting transmission units 35A~35C receives the proxy printing enabling information from the proxy printing enabling notification and processing units 36A~36C of the other computers that will be explained later, each of the proxy printing selecting transmission units 35A~35C judges whether or not the proxy printing enabling information matches the proxy printing request information 28. In the case where the proxy printing enabling information matches the proxy printing request information 28, each of the proxy printing selecting transmission units 35A~35C sends the application data and the printing setting information 15 to the computer that sent the proxy printing enabling information showing the match.

Upon reception of the transmission request notification, each of the proxy printing enabling notification and processing units 36A~36C sends the proxy printing enabling information to the computers that sent the transmission request notification. Upon reception of the application data and the printing setting information 15, each of the proxy printing enabling notification and processing units 36A~36C converts the application data into the PDL data and causes the corresponding one of the printers to carry out printing. As in the first embodiment, the proxy printing enabling notification and processing unit 36A of the computer 32A stores the information shown in FIG. 4 as the proxy printing enabling information 19A, while the proxy printing enabling notification and processing unit 36B of the computer 32B stores the information shown in FIG. 5 as the proxy printing enabling information 19B. In addition, the proxy printing enabling notification and processing unit 36C of the computer 32C stores the information shown in FIG. 6 as the proxy printing enabling information 19C.

Hereinafter, a procedure carried out in this embodiment will be explained with reference to a flow chart in FIG. 15. For the sake of simpler explanation, the case will be explained where a user using the computer 32A carries out duplex printing of the application data 14 generated by the application software 11C on A4-sized printing paper.

The user specifies whether printing is carried out by the computer he/she is using or by another one of the computers, and the transmission range wherein proxy printing is requested if proxy printing is carried, in the same manner as in the first embodiment. Therefore, detailed explanations thereof will be omitted, and only the procedure of carrying out proxy printing will be explained below.

At Step 301, the user specifies the application data to be printed, by using the computer 32A.

At Step 302, the user generates the printing setting information 15 as the printing conditions for the application data. As a result, the proxy printing request information 28 shown in FIG. 13 (comprising the application type 27 and the printing setting information 15) is generated in the proxy printing selecting transmission unit 35A.

At Step 303, a range of sending the transmission request notification is set. At this time, a transmission range setting window as shown in FIG. 16 may be displayed so that the computers 32B and 32C can be specified by the IP addresses thereof. As the transmission range, the range specified by the IP addresses or within the same node may be used, for example. A range including the computer being used by the user, that is, the computer 32A in this case, may be included in the range.

At Step 304, the proxy printing selecting transmission unit 35A of the computer 32A sends the transmission request notification to the proxy printing enabling notification and processing unit 36B of the computer 32B as a first destination.

At Step 305, the proxy printing enabling notification and processing unit 36B in the computer 32B receives the transmission request notification, and sends the proxy printing enabling information 19B stored therein to the proxy printing selecting transmission unit 35A of the computer 32A.

At Step 306, the proxy printing selecting transmission unit 35A of the computer 32A receives the proxy printing enabling information 19B, and compares the proxy printing enabling information 19B with the proxy printing request information 28. In this case, since the computer 32B does not have the application software 11C appropriate for the application type 27, the proxy printing enabling information 19B is not judged to match the proxy printing request information 28.

At Step 307, the proxy printing selecting transmission unit 35A of the computer 32A sends the transmission request notification to the proxy printing enabling notification and processing unit 36C of the computer 32C as the next destination.

At Step 308, the proxy printing enabling notification and processing unit 36C of the computer 32C receives the transmission request notification, and sends the proxy printing enabling information 19C stored therein to the proxy printing selecting transmission unit 35A of the computer 32A.

At Step 309, the proxy printing selecting transmission unit 35A of the computer 32A receives the proxy printing enabling information 19C, and compares the proxy printing enabling information 19C with the proxy printing request information 28. In this case, the computer 32C has the application software 11C corresponding to the application type 27, and the printing enabling setting information 18C (that is, the part corresponding to the printer driver 12A) matches the printing setting information 15. Therefore, the printing enabling information 19C is judged to match the proxy printing request information 28.

At Step 310, the proxy printing selecting transmission unit 35A of the computer 32A sends the application data and the printing setting information 15 to the proxy printing enabling notification and processing unit 36C of the computer 32C.

At Step 311, the proxy printing enabling notification and processing unit 36C of the computer 32C receives the application data and the printing setting information 15.

Thereafter, the same steps shown in FIG. 8 are carried out by the computers 32A and 32C, instead of the computers 2A and 2C.

As is clear from the above explanation, when the desired application data are printed in the desired printing conditions with use of any one of the computers 32A~32C in the network printing system in this embodiment, the proxy printing enabling information is received from the other computers in the case where the computer being used by the user does not have the application software and the printer driver appropriate for the desired printing conditions. The computer that can carry out proxy printing is selected, and printing can be carried out through transmission of the application data and the printing setting information to the computer, without a special apparatus on the network 31.

Furthermore, since each of the computers 32A~32C has the proxy printing selecting transmission unit 35A~35C and the proxy printing enabling notification and processing unit 36A~36C, processing for generating the PDL data is not concentrated on a specific one of the computers, which leads to an efficiency improvement.

Moreover, since the computers 32A~32C respectively have the proxy printing selecting transmission units 35A~35C, the proxy printing enabling notification and processing units 36A~36C do not need to judge whether or not proxy printing is carried out. Therefore, the configuration thereof can be simpler.

Figure 17:
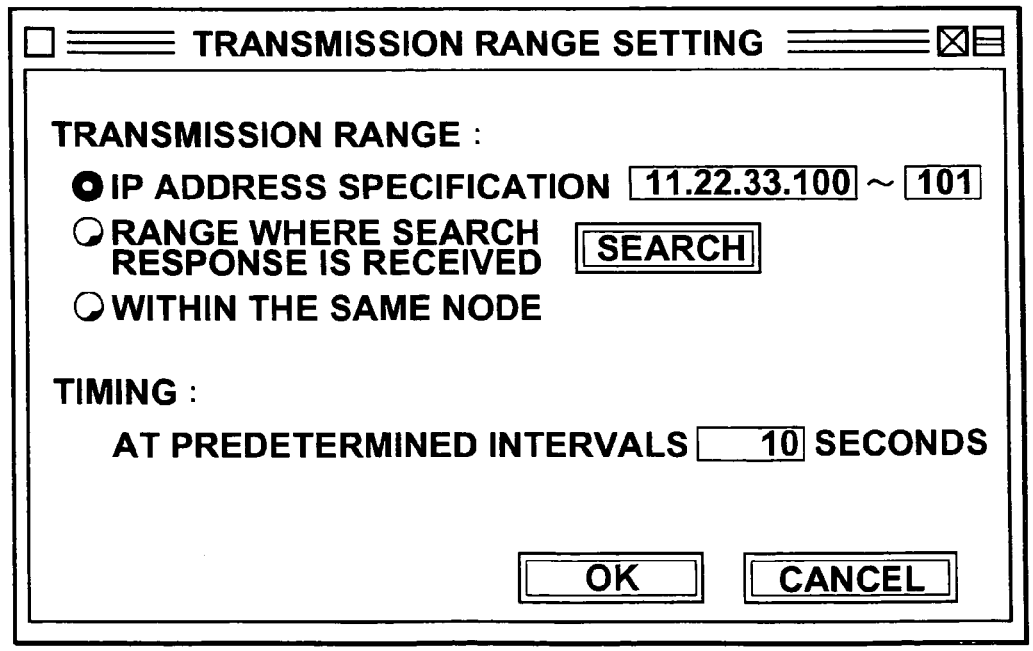
FIG. 17 shows another example of transmission range setting window.
Figure 18:
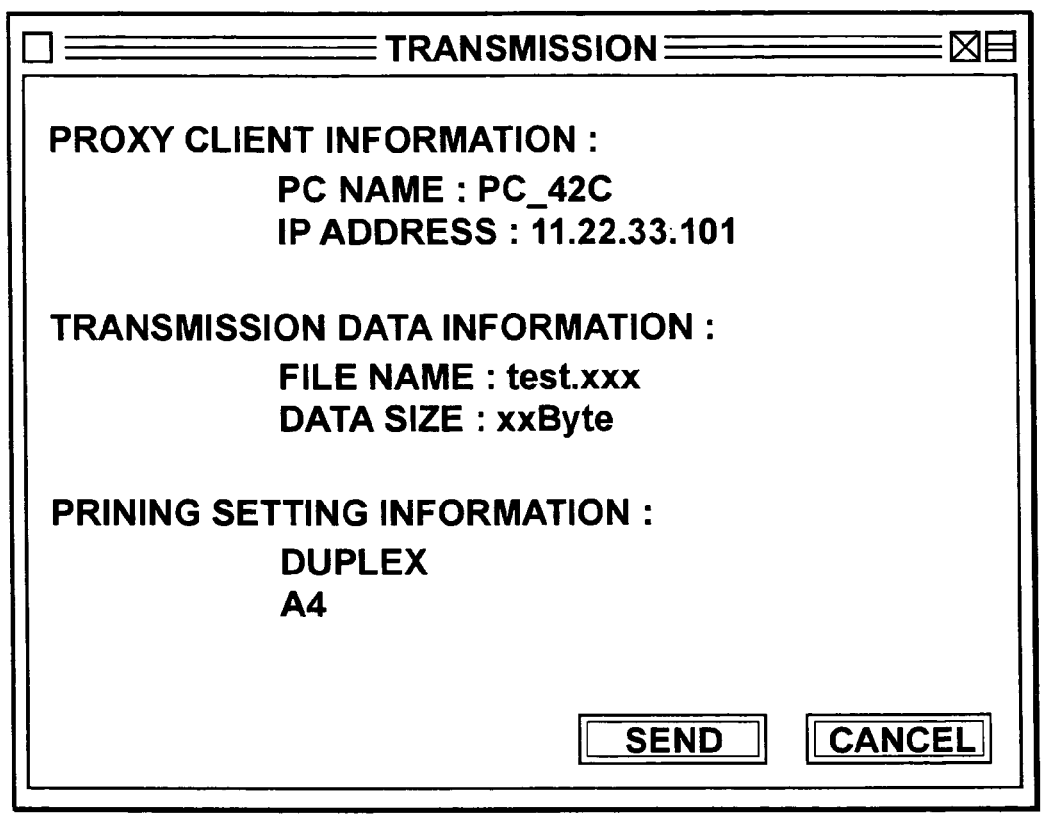
FIG. 18 shows a destination setting window.

A fourth embodiment of the present invention will be explained with reference to FIGS. 1, 17, and 18. In the fourth embodiment, the configuration thereof is almost the same as the first embodiment. Therefore, only components that are different from those in the first embodiment have reference numbers shown in FIG. 1. As shown in FIG. 1, a network 41 is connected to computers 42A~42C and the printers 3A and 3B.

In this system, each of the computers 42A~42C regularly receives proxy printing enabling information comprising the type of application software and printing enabling setting information in a printer driver installed in the other computers. When application data to be printed are selected, proxy printing request information is generated comprising the type of the application data and printing setting information as printing conditions for the application data. The proxy printing request information is compared with the proxy printing enabling information of the other computers received in advance. In the case where the proxy printing enabling information matches the proxy printing request information, the application data and the printing setting information are sent to the computer that sent the proxy printing enabling information for causing the computer to carry out printing.

As shown in FIG. 1, each of the computers 42A~42C has the application software and the printer driver installed therein. The computers 42A~42C respectively comprise proxy printing selecting transmission units 45A~45C and proxy printing enabling notification and processing units 46A~46C connected to the network 41. The computer 42A has the application software 11A and the application software 11B, and the printer driver 12B for the printer 3B. The computer 42B has the application software 11A and the printer driver 12A for the printer 3A as well as the printer driver 12B. The computer 42C has the application software 11A, the application software 11C, and the printer drivers 12A and 12B.

Each of the proxy printing enabling notification and processing units 46A~46C sends the proxy printing enabling information comprising the type of application software and the printing enabling setting information in the printer driver therein at predetermined intervals, such as at every 10 milliseconds to the proxy printing selecting transmission units 45A~45C of the other computers 46A~46C.

A transmission range wherein the proxy printing enabling information is sent is set in advance to the proxy printing enabling notification and processing units 46A~46C. When the transmission range is specified, a transmission range setting window as shown in FIG. 17 may be displayed so that the transmission range can be specified by the IP addresses thereof. As the transmission range, the range specified by the IP addresses or within the same node may be used. A range including the computer used for the specification may be used as the range.

When printing is carried out, each of the proxy printing selecting transmission units 45A~45C generates the proxy printing request information 28 comprising the application type 27 of the application data as the printing target and the printing setting information 15 as the printing conditions for the application data, as shown in FIG. 13. Each of the proxy printing selecting transmission units 45A~45C then compares the proxy printing request information 28 with the proxy printing enabling information received in advance. In the case where the proxy printing enabling information matches the proxy printing request information 28, each of the proxy printing selecting transmission units 45A~45C sends the application data and the printing setting information 15 to the computer that sent the proxy printing enabling information showing the match. At this time, a transmission range setting window as shown in FIG. 18 is displayed, and transmission destinations are specified by the IP addresses.

The computer that received the application data and the printing setting information 15 converts the application data into PDL data, and prints the PDL data by using the corresponding one of the printers.

As is clear from the explanation described above, when the desired application data are printed with use of one of the computers 42A~42C in the desired printing conditions in the network printing system in this embodiment, the computer that can carry out proxy printing is selected from the computers whose proxy printing enabling information has been received in advance even in the case where the computer being used does not have the application software appropriate for the desired application data and the printer driver appropriate for the printing conditions. By sending the application data and the printing setting information 15 to the computer that can carry out proxy printing, printing can be carried out without a special apparatus on the network 41.

Since each of the computers 42A~42C has the proxy printing selecting transmission unit 45A~45C and the proxy printing enabling notification and processing unit 46A~46C, concentration of the proxy printing processing on one of the computers can be prevented, which improves processing efficiency.

Furthermore, since each of the computers 42A~42C has the proxy printing selecting transmission unit 45A~45C, each of the proxy printing enabling notification and processing units 46A~46C does not need to judge whether or not proxy printing is carried out. Therefore, the configuration of the proxy printing enabling notification and processing unit 46A~46C can be simpler. In the third and fourth embodiments, a method such as NetBIOS or UDP (for broadcasting) may be used as a method of sending the proxy printing enabling information.

Moreover, in the case where proxy printing is carried out in the embodiments described above, priority of the computers that are used for requesting proxy printing may be set in such a manner that the printer closer to the user has higher priority for printing.

A print image of the application data to be printed may be generated before printing so that the user can confirm the image on the computer he/she is using. More specifically, the user may confirm the image by clicking a "Preview" button in the window shown in FIG. 9.

A program may be installed in at least one of computers on a network for requesting proxy printing while a program may be installed in another one of the computers for carrying out proxy printing by receiving a proxy printing request. In this manner, the predetermined computer or computers can request proxy printing from the computer having the program for carrying out proxy printing. Alternatively, each of the computers may be installed with the both programs so that proxy printing request and proxy printing can be carried out between the computers.

Furthermore, a program having the function of the computer requesting proxy printing and a program having the function of carrying out proxy printing by reception of the request may be kept in a stand-by state in each of the computers so that proxy printing can be carried out upon necessity.

The program having the function of the computer requesting proxy printing and the program having the function of carrying out proxy printing by reception of the request may be downloaded via the network for installation thereof.

What is claimed is:

1. A network printing system comprising:
  at least one printer and a plurality of computers connected to a network, at least of the one of the plurality of computers including a proxy printing requesting unit and a proxy printing transmission unit, the proxy printing requesting unit being configured to send proxy printing request information, including an application type of application data and printing setting information that represents a printing condition of the application data, to a plurality of other computers of the plurality of other computers, the proxy printing transmission unit being configured to send the application data and the printing setting information to one of the plurality of other computers that has sent a notice that proxy printing can be performed, after receiving the notice therefrom, and each of the plurality of other computers has at least one application, a printer driver appropriate for the at least one printer, a proxy printing judging unit, and a proxy printing processing unit, the proxy printing judging unit being configured to receive the proxy printing request information from the one of the plurality of computers, and compare the received proxy printing request information with its proxy printing enabling information including the application type of the at least one application and printing enabling setting information in the printer driver, and send the notice that the proxy printing can be performed if the proxy printing enabling information satisfies the proxy printing request information, the proxy printing processing unit being configured to start the at least one application that is appropriate for the application data when the proxy printing processing unit receives the application data and the printing setting information from the one of the plurality of computers, generate printing data from the application data, and carry out proxy printing by using the printer driver that satisfies the printing setting information, whereby the printing data are printed from the at least one printer, wherein each of the computers in the network printing system includes the proxy printing requesting unit, the proxy printing transmission unit, the proxy printing judging unit, and the proxy printing processing unit.

2. A network printing system comprising:

at least one printer and a plurality of computers connected to a network, at least one of the plurality of computers including a proxy printing enabling information receiving unit, a proxy printing selection unit and a proxy printing transmission unit, the proxy printing enabling information receiving unit being configured to receive, from each of the other computers of the plurality of computers, proxy printing enabling information, including the application type of application that each of the other computers has and printing enabling setting information in a printer driver of each of the other computers, the proxy printing selection unit being configured to compare the proxy printing enabling information received from each of the other computers with proxy printing request information, including the application type of application data and printing setting information that represents a printing condition of the application data, to judge whether the proxy printing enabling information received from each of the other computers satisfies the proxy printing request information, the proxy printing transmission unit being configured to send the application data and the printing setting information to at least one of the other computers that has been judged that the proxy printing enabling information satisfies the proxy printing request information, and each of the plurality of the other computers has at least one application, a printer driver appropriate for at least one printer, a proxy printing enabling information notifying unit and a proxy printing processing unit, the proxy printing enabling information notifying unit being configured to send the proxy printing enabling information about its computer to the one of the of the plurality of computers, the proxy printing processing unit being configured to start the at least one application that is appropriate for the application data when the proxy printing processing unit receives the application data and the printing setting information from the one of the plurality of computers, generate printing data from the application data, and carry out proxy printing by using the printer driver that satisfies the printing setting information, whereby the printing data are printed from the at least one printer, wherein each of the computers in the network printing system includes the proxy printing enabling information receiving unit, the proxy printing selection unit, the proxy printing transmission unit, the proxy printing enabling information notifying unit, and the proxy printing processing unit.

3. A non-transitory computer-readable recording medium stored therein a program that causes a computer to function in a network printing system comprising:

at least one printer and a plurality of computers connected to a network, at least one of the plurality of computers including a proxy printing requesting means and a proxy printing transmission means, the proxy printing requesting means being configured to send proxy printing request information, including the application type of application data and printing setting information that represents a printing condition of the application data, to a plurality of other computers of the plurality of computers, the proxy printing transmission means being configured to send the application data and the printing the printing setting information to one of the plurality of other computers that has sent a notice that proxy printing can be performed, after receiving the notice therefrom, and each of the plurality of other computers has at least one application, a printer driver appropriate for the at least one printer, a proxy printing judging means, and a proxy printing processing means, the proxy printing judging means being configured to receive the proxy printing request information from the one of the plurality of computers, and compare the received proxy printing request information with its proxy printing enabling information including the application type of the at least one application and printing enabling setting information in the printer driver, and send the notice that proxy printing can be performed if the proxy printing enabling information satisfies the proxy printing request information, the proxy printing processing means being configured to start the at least one application that is appropriate for the application data when the proxy printing processing means receives the application data and the printing setting information from the one of the plurality of computers, generate printing data from the application data, and carry out proxy printing by using the printer driver that satisfies the printing setting information, whereby the printing data are printed from the at least one printer, wherein each of the computers in the network printing system includes the proxy printing requesting means, the proxy printing transmission means, the proxy printing judging means, and the proxy priming processing means, and wherein the program causing the computer to function as the proxy printing requesting means, the proxy printing transmission means, the proxy printing judging means, and the proxy printing processing means.

4. A non-transitory computer-readable recording medium stored therein a program that causes a computer to function in a network printing system comprising:

at least one printer and a plurality of computers connected to a network, at least one of the plurality of computers including a proxy printing enabling information receiving means, a proxy printing selection means and a proxy printing transmission means, the proxy printing enabling information receiving means being configured to receive, from each of other computers of the plurality of computers, proxy printing enabling information, including the application type of application that each of the other computers has and printing enabling setting information in a printer driver of each of the other computers, the proxy printing selection means being configured to compare the proxy printing enabling information received from each of the other computers with proxy printing request information, including the application type of application data and printing setting information that represents a printing condition of the-application data, to judge whether the proxy printing enabling information received from each of the other computers satisfies the proxy printing request information, the proxy printing transmission means being configured to send the application data and the printing setting information to at least one of the other computers that has been judged that the proxy printing enabling information satisfies the proxy printing request information, and each of the plurality of other computers has at least one application, a printer driver appropriate for the at least one printer, a proxy printing enabling information notifying means and a proxy printing processing means, the proxy printing enabling information notifying means being configured to send the proxy printing enabling information about its computer to the one of the plurality of computers, the proxy printing processing means being configured to start the at least one application that is appropriate for the application data when the proxy printing processing means receives the application data and the printing setting information from the one of the plurality of computers, generate printing data from the application data, and carry out proxy printing by using the printer driver that satisfies the printing setting information, whereby the printing data are printed from the at least one printer, wherein each of the computers in the network printing system includes the proxy printing enabling information receiving means, the proxy printing selection means, the proxy printing transmission means, the proxy printing enabling information notifying means, and the proxy printing processing means, and wherein the program causing the computer to function as the proxy printing enabling information receiving means, the proxy printing selection means, the proxy printing transmission means, the proxy printing enabling information notifying means, and the proxy printing processing means.

* * * * *